United States Patent [19]

Honma

[11] Patent Number: 6,002,845
[45] Date of Patent: Dec. 14, 1999

[54] IMAGE PROCESSING APPARATUS WITH MEANS FOR STORING IMAGE INFORMATION OF A PLURALITY OF PAGES

[75] Inventor: Masayuki Honma, Tokyo, Japan

[73] Assignee: Canon Kabushiki Kaisha, Tokyo, Japan

[21] Appl. No.: 09/017,294

[22] Filed: Feb. 2, 1998

[30] Foreign Application Priority Data

Feb. 3, 1997 [JP] Japan ................................. 9-034425

[51] Int. Cl.$^6$ ............................ B41B 15/00; H04N 1/00; H04N 1/40
[52] U.S. Cl. ........................ 395/115; 395/115; 395/114; 395/116; 395/117; 358/444; 358/448; 358/404
[58] Field of Search .................... 395/115, 116, 395/117, 114; 358/444, 448, 404

[56] References Cited

U.S. PATENT DOCUMENTS 5,703,693  12/1997  Morikawa ............................... 358/296
5,724,490   3/1998  Shibaki et al. .......................... 395/114

Primary Examiner—Edward L. Coles
Assistant Examiner—Twyler Lamb
Attorney, Agent, or Firm—Fitzpatrick, Cella, Harper & Scinto

[57] ABSTRACT

Image information of a plurality of pages input from a personal computer is stored in a hard disk. In an operation mode which can be executed only after all pages of one group are stored in the hard disk, if the hard disk becomes full before all the pages are stored, reduced images from the start to fourth pages are printed out on a single recording sheet to notify a user of a memory-full state. On this sheet, a message representative of that the hard disk is in a memory-full state is also printed out.

24 Claims, 11 Drawing Sheets

FIG. 6

ERROR REPORT  FOLLOWING DOCUMENT CAN NOT BE PRINTED DUE TO HD FULL

DOCUMENT NAME  ○○PROPOSED PLAN  JUNE 14, 1996 14:02

○○PLAN

××DEPARTMENT△△ SECTION

PLAN A

PLAN B

PLAN C

FIG. 11

ERROR HISTORY

| NO. | DOCUMENT NAME | ERROR CONTENTS | TIME AND DATE |
|---|---|---|---|
| 6 | ○○PROPOSED PLAN | HD FULL | JUNE 14  14:02 |
| 7 | BUSINESS FORMATS | HD FULL | JUNE 17  11:18 |
| 8 | PRODUCT PLAN | HD FULL | JUNE 19   9:31 |
| 9 | PATENT | HD FULL | JUNE 19  13:58 |
| 10 | CONFERENCE DOCUMENTS | HD FULL | JUNE 21  15:41 |

▷ 701
◁ 702

RETURN ~700
PRINT ~703

IMAGE PROCESSING APPARATUS WITH MEANS FOR STORING IMAGE INFORMATION OF A PLURALITY OF PAGES

BACKGROUND OF THE INVENTION

1. Field of the Invention

The present invention relates to an image processing apparatus with means for storing image information of a plurality of pages.

2. Related Background Art

Digital copiers with an electronic sorting function are already known in which images of all originals to be copied are read, the image data is temporarily stored in a memory such as a hard disk, and image data of desired originals are sequentially read from the memory and printed out. These copiers can discharge copied sheets in a sorted state without using a sorter.

An electronic sorting function for images written with page descriptive language (PDL) is also known in which a digital copier receives image data written with PDL used as an application of a host computer via a network and develops a PDL image into a bit map image, the image data is temporarily stored in a memory such as a hard disk, and data of desired images is sequentially read from the memory and printed out and sorted.

In order for a copier (printer) to print out images in the reverse page order to that input from a host computer, in some cases, after images developed from input PDL images are all stored in a hard disk, they are read from the hard disk in the reverse order.

Consider a case wherein reduced images of four original pages read from the last page by a copier are copied on one side of a single copy sheet in a reduced layout (4 in 1). In this case, if there is a remainder when the number of originals is divided by 4 (original number/4), it is necessary to provide a margin corresponding to (4−remainder) on a copy sheet on which the last page is printed. This is because a margin is formed on a copy sheet on which the first page of originals is copied, if a full (4 in 1) layout is made starting from the last page of originals, and the outer appearance of the first page becomes unattractive. In order to avoid this, a copier capable of performing a (4 in 1) layout stores all images sequentially read from the last page in a hard disk, and when the last page is read, the number of originals is checked.

Such a copier (printer) with a hard disk has therefore an operation mode in which only after all images of one group are stored in a hard disk, image reading from the hard disk starts.

However, a memory such as a hard disk for storing image data has a limit in its capacity so that the number of originals whose images can be stored is limited. For example, assuming that a memory (hard disk) has a capacity capable of storing images of 100 A4 sheets and the number of A4 originals is 102, although images of 100 originals can be stored in the memory, images of the two remaining originals cannot be stored (memory-full state).

In such a case, the above-described operation mode cannot be executed so that images stored in the memory are cancelled. A problem arises, however, that a user cannot discriminate between whether this case has occurred simply because a job designated by the user is still not printed, and whether this case has occurred by some errors of the copier. If a memory-full state is displayed on an operation panel of the copier, a user which requested a job not associated with the memory-full state feels anxious.

SUMMARY OF THE INVENTION

It is an object of the present invention to provide an image processing apparatus capable of solving the above problems.

It is an object of the present invention to provide an image processing apparatus capable of making a user discriminate a state that image information of one group constituted of a plurality of pages cannot be completely stored.

The other objects and aspects of the present invention will become apparent from the following detailed description of embodiments when read in conjunction with the accompanying drawings.

BRIEF DESCRIPTION OF THE DRAWINGS

FIG. 6 is an illustrative diagram showing a print-out example of layout memory information of the first embodiment.

FIG. 11 is an illustrative diagram showing a display example of the document names, error contents, dates and times respectively of past jobs with errors, according to the third embodiment.

DETAILED DESCRIPTION OF THE PREFERRED EMBODIMENTS

Figure 1:
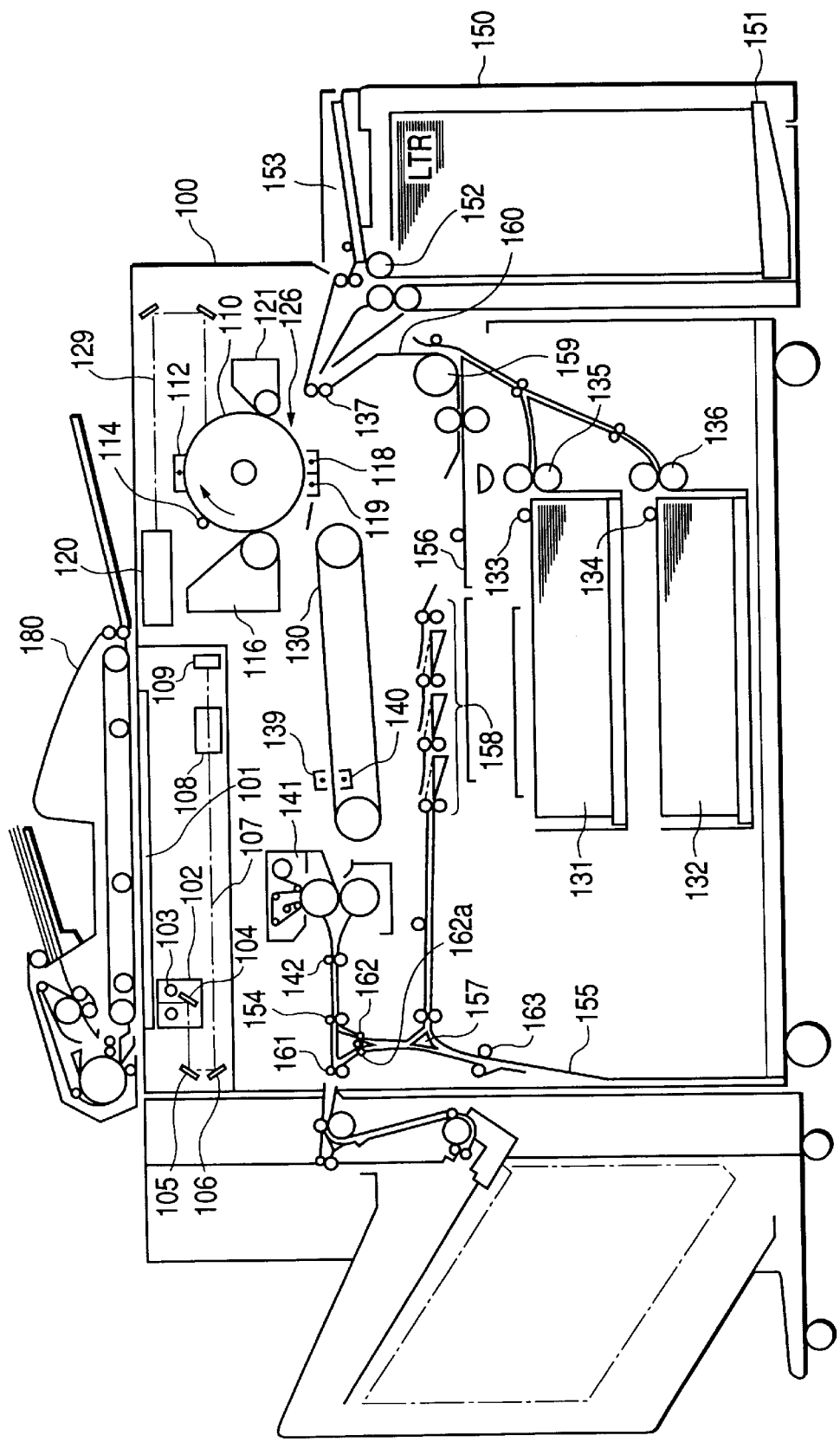
FIG. 1 is a cross sectional view showing an example of the structure of an image forming apparatus according to an embodiment of the invention.

FIG. 1 is a cross sectional view showing an example of the structure of an image forming apparatus according to an embodiment of the invention. The image forming apparatus has a copier main body 100 and a cyclical automatic original feeder (RDF) 180.

A platen glass 101 serves as an original placing plate on which an original is placed. A scanner 102 is constituted of an original illuminating lamp 103 and a scanning mirror 104. The scanner 102 is reciprocally moved in a predetermined direction by an unrepresented motor. Light reflected from the original is passed through a lens 108 via scanning mirrors 104 to 106 and focussed upon a CCD sensor 109.

An exposure controller 107 is constituted of a laser, a polygon scanner and the like and applies a laser beam 129 to a photosensitive drum 110, the laser beam 129 being modulated by an image signal converted into an electrical signal by the CCD sensor 129 and subjected to predetermined image processing to be described later. Mounted around the photosensitive drum 110 are a primary charger 112, a developing unit 121, a transfer charger 118, a cleaning unit 116 and a pre-exposure lamp 114.

In an image forming unit 126, the photosensitive drum 110 is rotated by an unrepresented motor in a direction indicated by an arrow in FIG. 1. After the photosensitive drum 110 is charged to a predetermined potential by the primary charger 112, the laser beam 129 is applied thereto by the exposure controller 120 to thereby form a latent image.

This latent image formed on the photosensitive drum 110 is developed by the developing unit 121 and visualized as a toner image. A transfer sheet fed from an upper cassette 131 or a lower cassette 132 via pickup rollers 133 and 134 is supplied to the copier main body 100 by paper feed rollers 135 and 136, and transported to a transfer belt 130 by a registration roller 137. The visualized toner image is then transferred to the transfer sheet by the transfer charger 118. After this image transfer, residual toner on the photosensitive drum is cleaned with the cleaning unit 116 and residual charges are removed with the pre-exposure lamp 114.

The transfer sheet is thereafter separated from the transfer belt 130, and the toner image is again charged by pre-fixation chargers 139 and 140 and fixed at a fixing unit 141 through pressure and heating. The transfer sheet is discharged from the copier main body 100 by a discharge roller 142.

A suction charger 138 sucks the transfer sheet transported by the registration roller onto the transfer belt 130. A transfer belt roller 139 is used for rotating the transfer belt 130 and operates in combination with the suction charger 138 to suck the transfer sheet onto the transfer belt 130 with electric charges.

The copier main body 100 is provided with a deck 150 capable of accommodating, for example, 1000 transfer sheets. A lifter 151 lifts the deck 150 by an amount corresponding to the quantity of transfer sheets so that a paper feed roller 152 always contact the transfer sheet in the deck 150. The copier main body 100 is also provided with a manual multi-feeder 153 which can accommodate 100 transfer sheets.

A paper discharge flapper 154 shown in FIG. 1 changes a path between a discharge side path and a both-side recording path or a multi-recording path. A transfer sheet transported by the paper discharge roller 142 is sent to the both-side recording path or multi-recording path by the paper discharge flapper 154. A lower transport path 158 introduces the transfer sheet transported by the paper discharge roller 142 to a paper re-feeding tray 156 after being turned upside down by a reversing flapper 157. A multi-flapper 157 switches between the both-side recording path and multi-recording path. If the multi-flapper 157 is turned to the left, the transfer sheet is directly introduced to the lower transport path 158 without introducing it to the reversing path 155.

A paper feed roller 159 feeds the transfer sheet to the photosensitive drum 126 side via a path 160. A discharge roller 161 is disposed near at the paper discharge flapper 154 and discharges the transfer sheet switched to the discharge side by the paper discharge flapper 154, out of the main body 100. For the both-side recording (both-side copy) or multi-recording (multi-copy), the paper discharge flapper 154 is moved upward to accommodate the copied transfer sheet in the paper re-feeding tray 156 in an upside-down state made by transport paths 155 and 158.

For the both-side recording, the multi-flapper 157 is turned to the right, whereas for the multi-recording, transfer sheets accommodated in the paper re-feeding tray 156 are introduced one sheet after another from the bottom one to the resist roller 137 by the paper feeding roller 159 via the path 160.

In discharging the transfer sheet out of the main body by turning it upside down, the paper discharge flapper 154 is raised and the flapper 157 is turned to the right. After the copied transfer sheet is transported to the transport path 155 side and the back end of the transfer sheet passes thorough a first feed roller 162, the transfer sheet is transported to a second feed roller side by a reversing roller 163, and turned upside down by the discharge roller 161 and discharged out of the main body.

Figure 2:
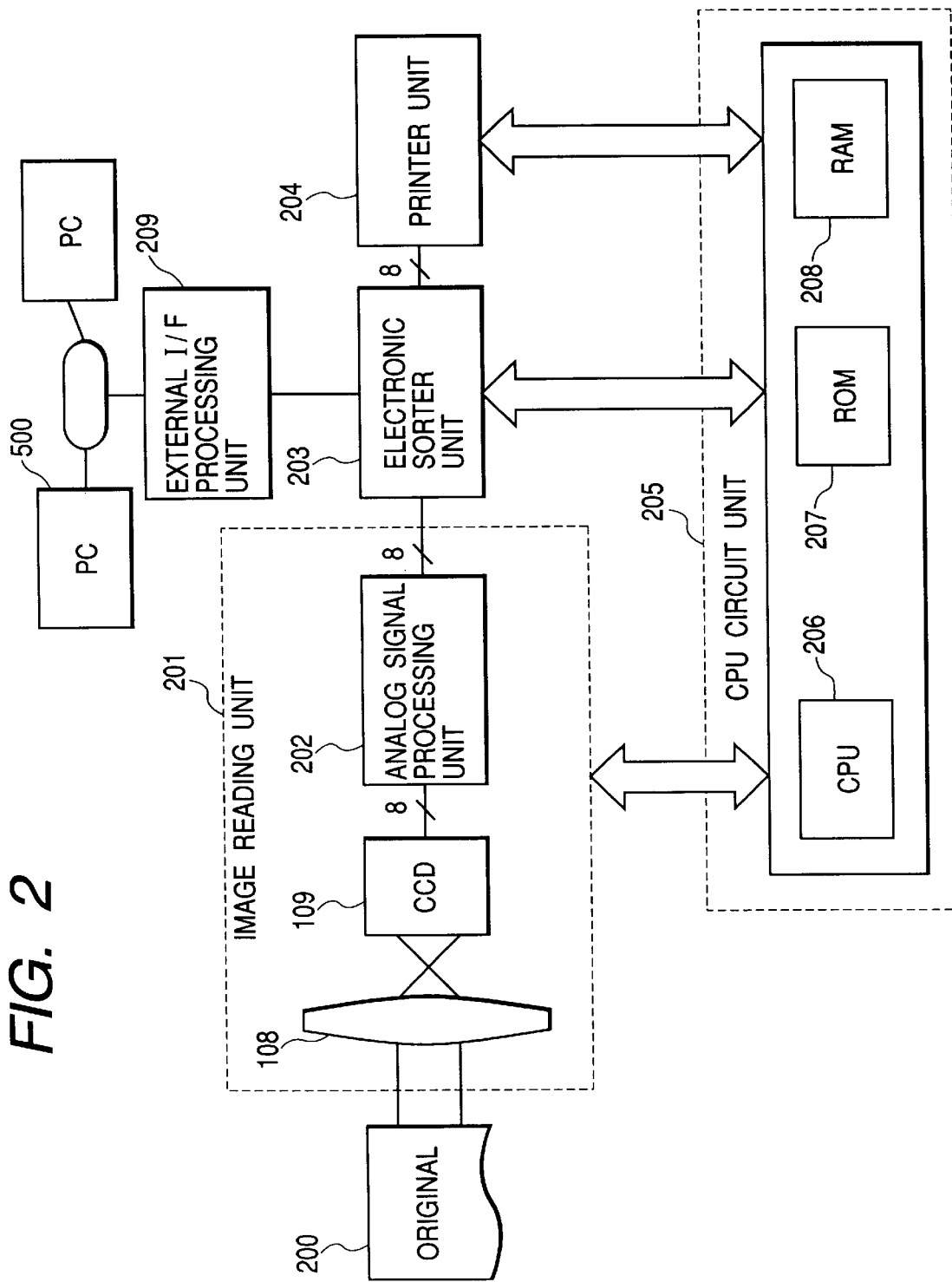
FIG. 2 is a block diagram showing the electronic system of the image forming apparatus of the embodiment.

FIG. 2 is a block diagram showing the electronic system of the image forming apparatus of the embodiment.

An image reading unit 201 is constituted of the CCD sensor 109, an analog signal processing unit 202 and the like. The image of an original focussed onto the CCD sensor 109 via the lens 108 is converted into an analog electrical signal by the CCD sensor 109. The converted analog image signal is input to the analog signal processing unit and subjected to sample/hold, dark level correction and the like to thereafter analog/digital converted (A/D conversion). The digital signal is subjected to shading correction (correction of performance variation in original reading sensors and correction of light distribution characteristics of an original illuminating lamp) and variable magnification processing, and thereafter input to an electronic sorter unit 203.

The electronic sorter unit 203 performs a correction process necessary for output systems such as a gamma correction process, a smoothing process, an edge emphasizing process, and other necessary processes, and the processed image signal is supplied to a printer unit 204. The printer unit 204 records an image on a transfer sheet by using the exposure controller such as a laser described with FIG. 1.

A CPU circuit unit 205 is constituted of a CPU 206, a ROM 207, a RAM 208 and the like, controls the image reading unit 201, electronic sorter unit 208, printer unit 204 and the like to thereby control the whole sequence of the apparatus.

An external I/F processing unit 209 develops a PDL image input from an external personal computer (host computer) 500 via a network into a bit map image which is input as image data to the electronic sorter unit 203.

Figure 3:
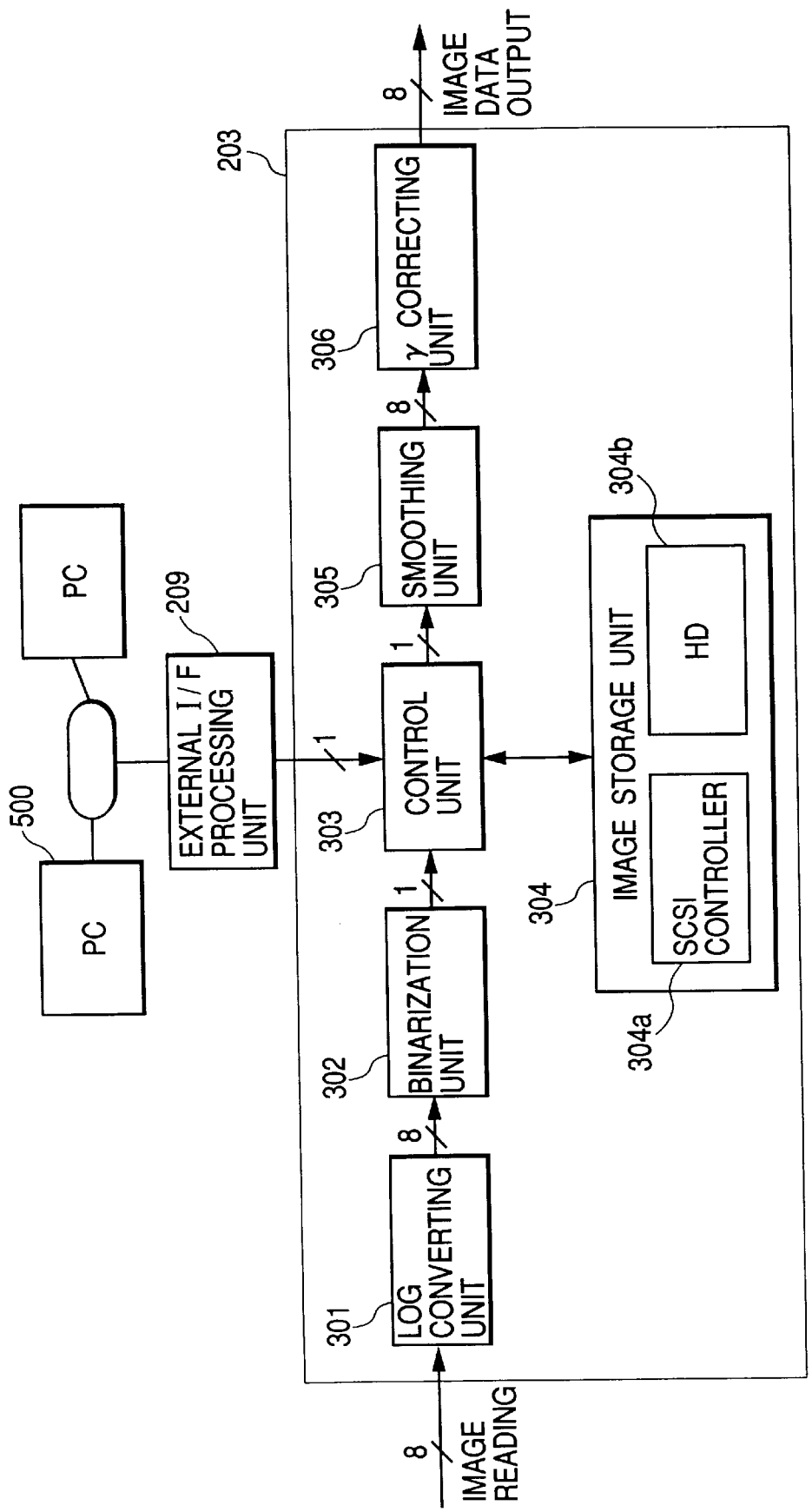
FIG. 3 is a block diagram showing the detailed structure of an electronic sorter of the embodiment.

FIG. 3 is a block diagram showing the detailed structure of the electronic sorter unit 203.

An image sent from the image reading unit 201 is input to a log converting unit 301 as black luminance data. The log converting unit 301 stores therein a look-up table (LUT) for converting input luminance data into density data by outputting a table value corresponding to the input data.

The density data is then sent to a binarization unit 302 which binarizes multi-value density data to obtain a density value of "0" or "255". The binarized 8-bit image data is converted into one-bit image data "0" or "1" to reduce the amount of image data to be stored in a memory.

With this image binarization, however, the number of image tonal levels are changed from 256 levels to 2 levels. Image data having a large portion of a half-tone image such as a photograph image lowers its image quality considerably upon binarization. It is therefore necessary to provide pseudo half-tone representation by using binary data. For the pseudo half-tone representation by using binary data, an error diffusion method is used in this embodiment.

With this method, if the density of an image is larger than a threshold value, this image is assumed as having density data of "255", whereas if the density of an image is equal to or smaller than the threshold value, this image is assumed as having density data of "0". After this binarization, error signals representative of a difference between each actual density data and binarized data are distributed to nearby pixels.

With this error signal distribution, error signals caused by the binarization are multiplied by preset weight coefficients of a matrix, and the results are added to nearby pixels. In this manner, the average density of the whole image can be retained and the half-tone can be represented by binary values in a pseudo manner.

The binarized image data is sent to a control unit 303. The bit map image data obtained by developing a PDL image supplied from the computer 500 via the external I/F processing unit 209 is directly sent to the controller 303 because the bit map image data has already been binarized by the external I/F processing unit 209.

In response to an instruction from the main body, the control unit 303 operates to temporarily store the image read by RDF and the bit map image from the external I/F processing unit developed from a PDL image, into an image storage unit 304, and to sequentially read the image data from the image storage unit 304.

The image storage unit 304 has a SCSI controller 304a and a hard disk (memory) 304b. The image data is written in the hard disk 304b in accordance with an instruction from the SCSI controller 304a. A plurality of image data sets stored in the hard disk 304b are printed in the order corresponding to an editing mode designated by the operation panel of the copier main body.

For example, if PDL images sent from a top page are to be printed in the reverse order and electronically sorted, bit map images of all PDL images sent from the host are temporarily stored in the hard disk 304b, and thereafter the bit map images are read from the hard disk 304b from the start page to the last page and printed out. These operations are repeated the number of copy sets requested by the computer 500 to thereby realize electronic sorting.

The image data read from the image storage unit 304 and the image data not stored in the image storage unit are sent to a smoothing unit 305 which first converts one-bit data into 8-bit data and then change the image data to a density value "0" or "255".

The converted image data is replaced by a weighted average value obtained from a sum of the preset matrix coefficients multiplied by density values of nearby pixels. In this manner, the binary data can be converted into multi-value data in accordance with the density values of nearby pixels to obtain the image quality near to that of the actually read pixels. The smoothed image data is input to a gamma correcting unit 306 which adjusts the density data by using a LUT matching the printer characteristics, in accordance with density values set with the operation unit.

Figure 4:
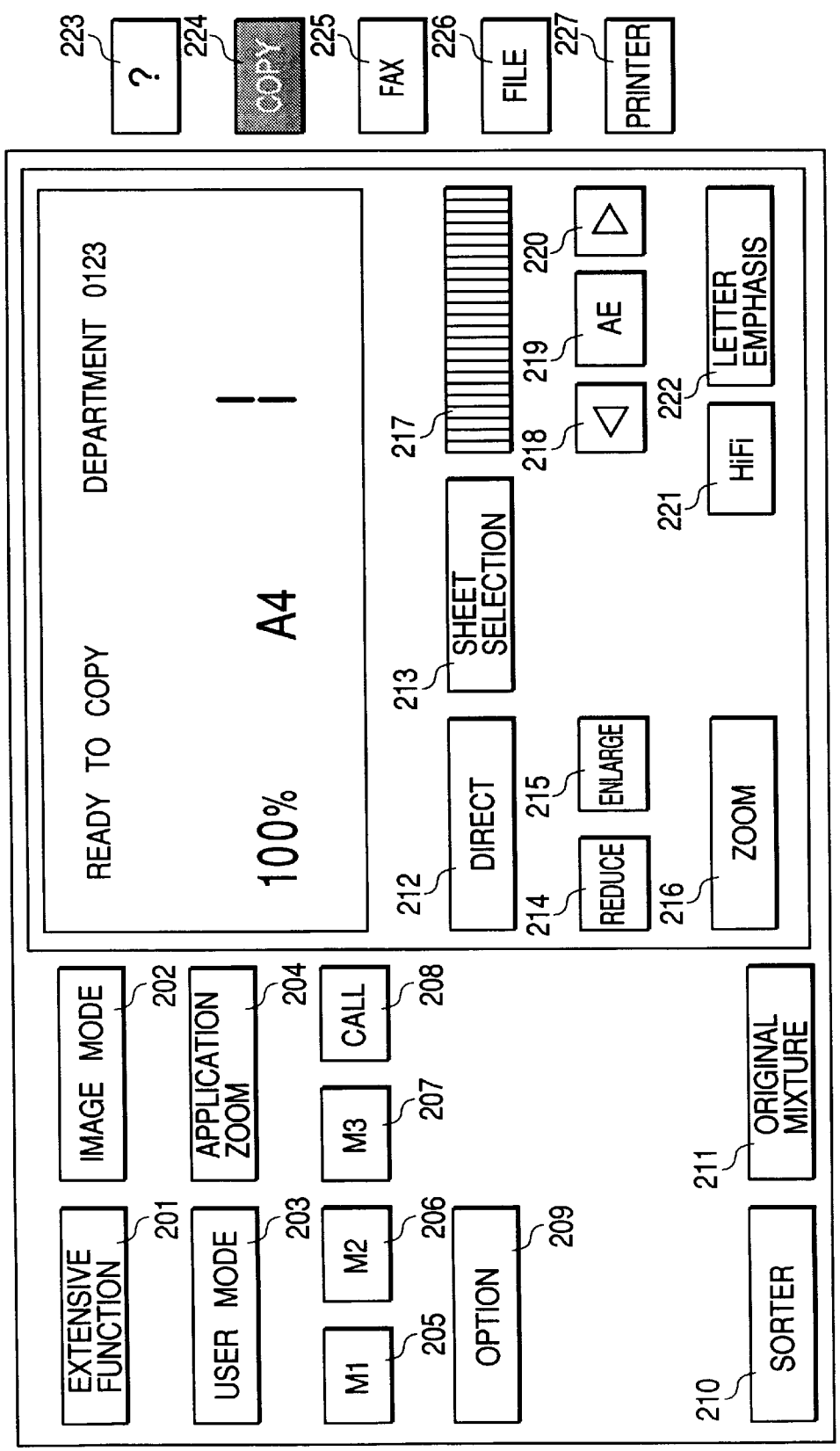
FIG. 4 is an illustrative diagram showing a basic display screen on an operation panel of a copier of the embodiment.

FIG. 4 is an illustrative diagram showing a basic display screen on the operation panel of the copier 100 of the embodiment. This operation panel is made of a touch panel so that each function displayed in a frame can be performed by touching the inside of the frame.

A copy mode key 244 is depressed when a copy operation is performed. When this key 224 is depressed, a copy mode screen shown in FIG. 4 is displayed. An extensive function key 201 is depressed to enter a mode of both-side copy, multi-copy, movement, binding margin set, frame removal set, or the like. An image mode key 202 is depressed to enter a mode of meshing, shading, trimming, or masking of a copied image.

A user mode key 203 is depressed to register a mode memory or set a standard mode display screen. An application zoom key 204 is depressed to enter a mode of setting a variable magnification of an original independently for the X- and Y-directions or a zoom program mode of calculating a variable magnification from an original size and a copy size.

An M1 key 205, an M2 key 206 and an M3 key 207 are used for calling mode memories registered for the respective keys. An option key 209 is used for setting an optional function such as a film projector for copying an image directly from a film.

A sorter key 210 is used for selecting either a mechanical sorter or an electronic sorter, or for setting a mode of sort or group of the sorter. An original mixture key 211 is used when both A4 and A3 size originals or both B5 and B4 size originals are placed on the original feeder. The electronic sorter is realized by the image storage unit 304 described above.

A direct key 212 is depressed when a copy magnification factor is set to 100%. A reduce key 214 is depressed when a regular reduction factor is set, and an enlarge key 215 is depressed when a regular magnification factor is set. A sheet selection key 213 is depressed when a copy sheet is selected. Each time a density key 218 is depressed, the density of an image to be copied is set darker, whereas each time a density key 220 is depressed, the density of an image to be copied is set lighter. A density display unit 217 changes its display area to right and left as the density key is depressed. An AE key 219 is depressed to copy an image with a dark background such as a newspaper, by automatically adjusting its density.

An HiFi key 221 is depressed when an original having a large half-tone portion such as a photograph original is copied. A letter emphasis key 222 is depressed when each letter of a character original is emphasized. A guide key 223 is depressed to display the function of each key when a user does not know the function.

A fax key 225 is depressed to fax an image, and a file key 226 is depressed to output file data.

A printer key 227 is depressed to change a print density, or to check the print output results of a PDL image supplied from the remote computer 500 as is related to the present invention.

Next, with reference to FIGS. 5 to 7, the control procedure according to the first embodiment of the invention will be described. The flow chart shown in FIG. 5 illustrates the control procedure used in an operation mode in which only after all image data is stored in HD 304b, the image data is permitted to be read from HD 304b, i.e., in an operation mode of printing image data in the reverse order to the order of input PDL data, or in an operation mode of printing image data in accordance with a layout determined from the counted number of all original pages.

Figure 5:
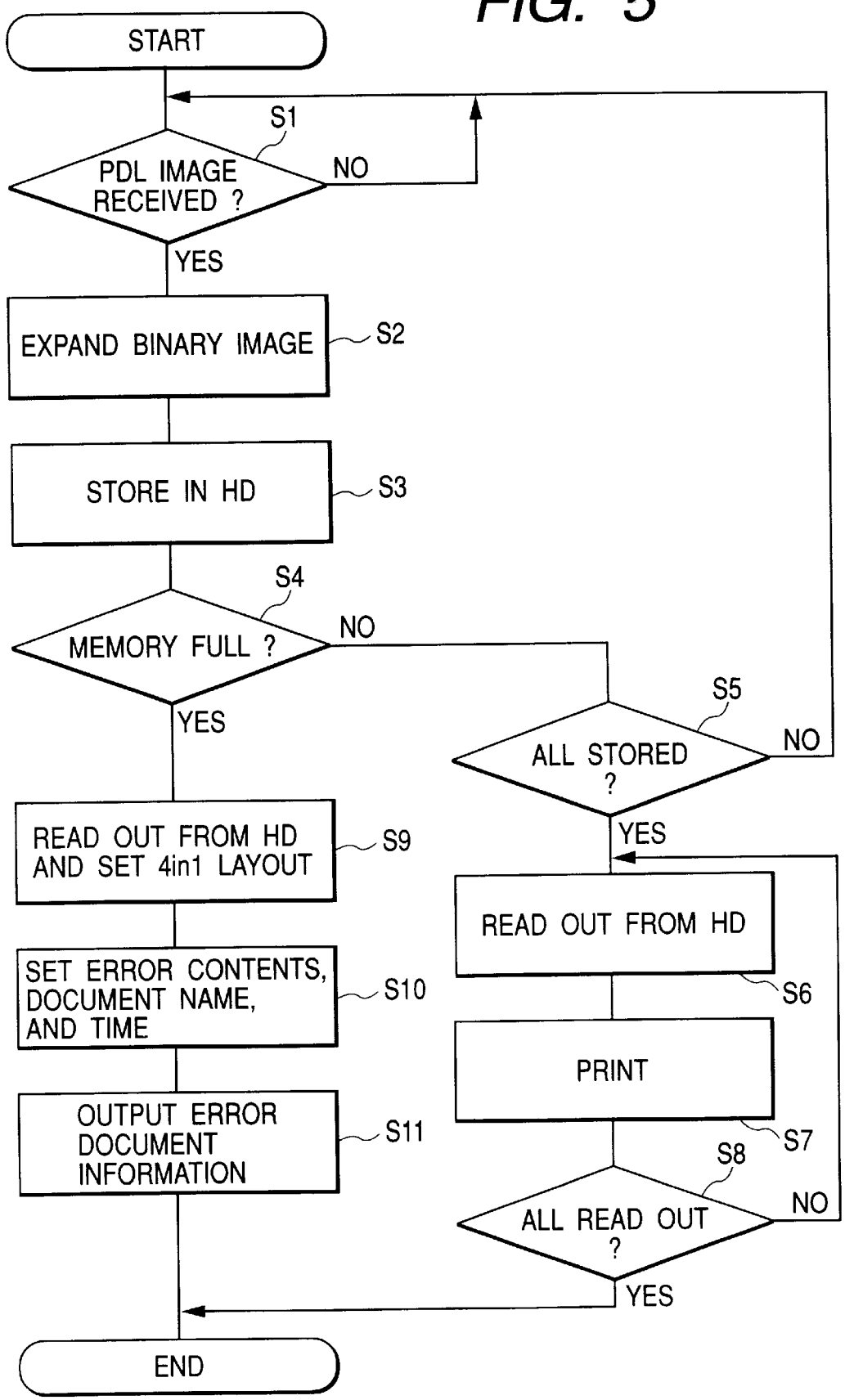
FIG. 5 is a flow chart illustrating a control procedure according to a first embodiment of the invention.

In the flow chart shown in FIG. 5, at step (S1) the external I/F processing unit 209 of the copier stands by until a PDL image is received from the computer 500. When a PDL image is received, the external I/F processing unit 209 develops the received PDL image into a binary bit map image at step (S2), and the electronic sorter unit 203 stores the bit map image in HD 304b at step (S3).

At step (S4) it is checked whether HD 304b of the electronic sorter unit 203 is full (memory-full). If not, at step (S5) it is checked whether all pages of the PDL job have been stored. If not, the flow returns to step (S1) to wait for a reception of the next PDL original page.

If it is judged at step (S5) that all pages of the PDL job have been stored in HD 304*b*, an image stored in HD 304*b* is read at step (S6) and printed out at step (S7) on a recording sheet. It is checked at step (S8) whether all images have been read. If not, the flow returns to step (S6) to repeat printing. The above operations are repeated for all originals as many times as the number of copy sets requested by a user.

If it is judged as a memory-full at step (S4), at step (S9) only four images are read from those images stored in HD 304*b* and stored in a layout memory (DRAM) in a (4-in-1) layout. At step (S10) the layout memory is also written with character fonts of a sentence indicating the error contents, of a document name of originals and of the date and time received by the external I/F processing unit 209 from the host. At step (S11) the error original information stored in the layout memory is output.

For example, as shown in FIG. 6, information written in the layout memory is directly printed out on a recording sheet.

Figure 7:
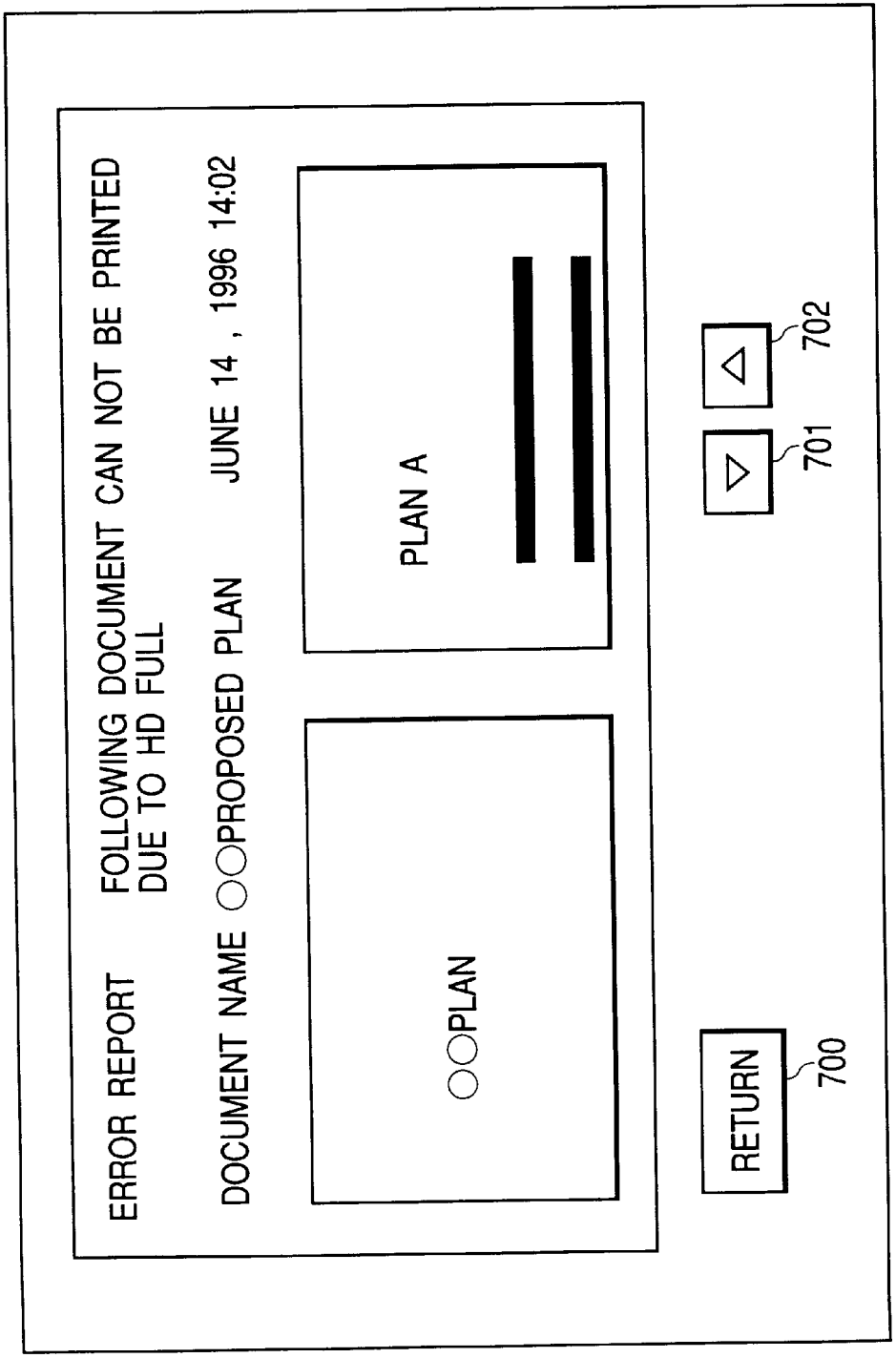
FIG. 7 is an illustrative diagram showing a display example of layout memory information of the first embodiment.

As shown in FIG. 7, the information written in the layout memory may be displayed on the operation panel of the copier in the form of bit map image, and scrolled by using up/down keys 701 and 702.

The information written in the layout memory may be transmitted as an E-mail to the computer 500 from which a print instruction was issued. In this case, the image shown in FIG. 6 is displayed at the computer 500. Observing this display, a user may wait until HD 304*b* becomes empty and issue again a print request. A user may issue a print request by changing a mode to another mode which allows a print operation without storing all pages.

Next, with reference to FIGS. 8 and 9, the control procedure according to the second embodiment of the invention will be described. Similar to the first embodiment, the flow charts shown in FIGS. 8 and 9 illustrate the control procedure used in an operation mode in which only after all image data is stored in HD 304*b*, the image data is permitted to be read from HD 304*b*.

Figure 8:
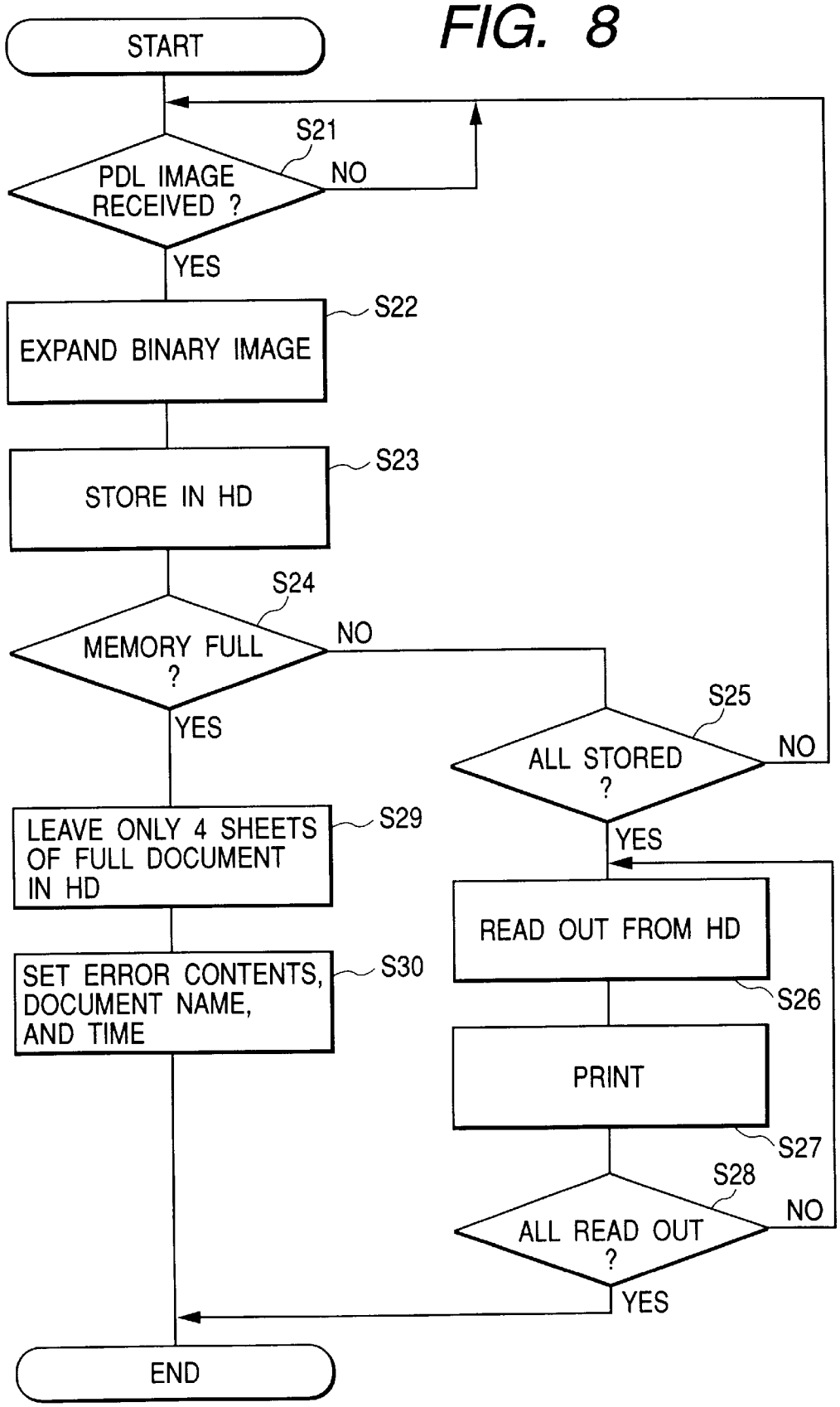
FIG. 8 is a flow chart illustrating a control procedure according to a second embodiment of the invention.
Figure 9:
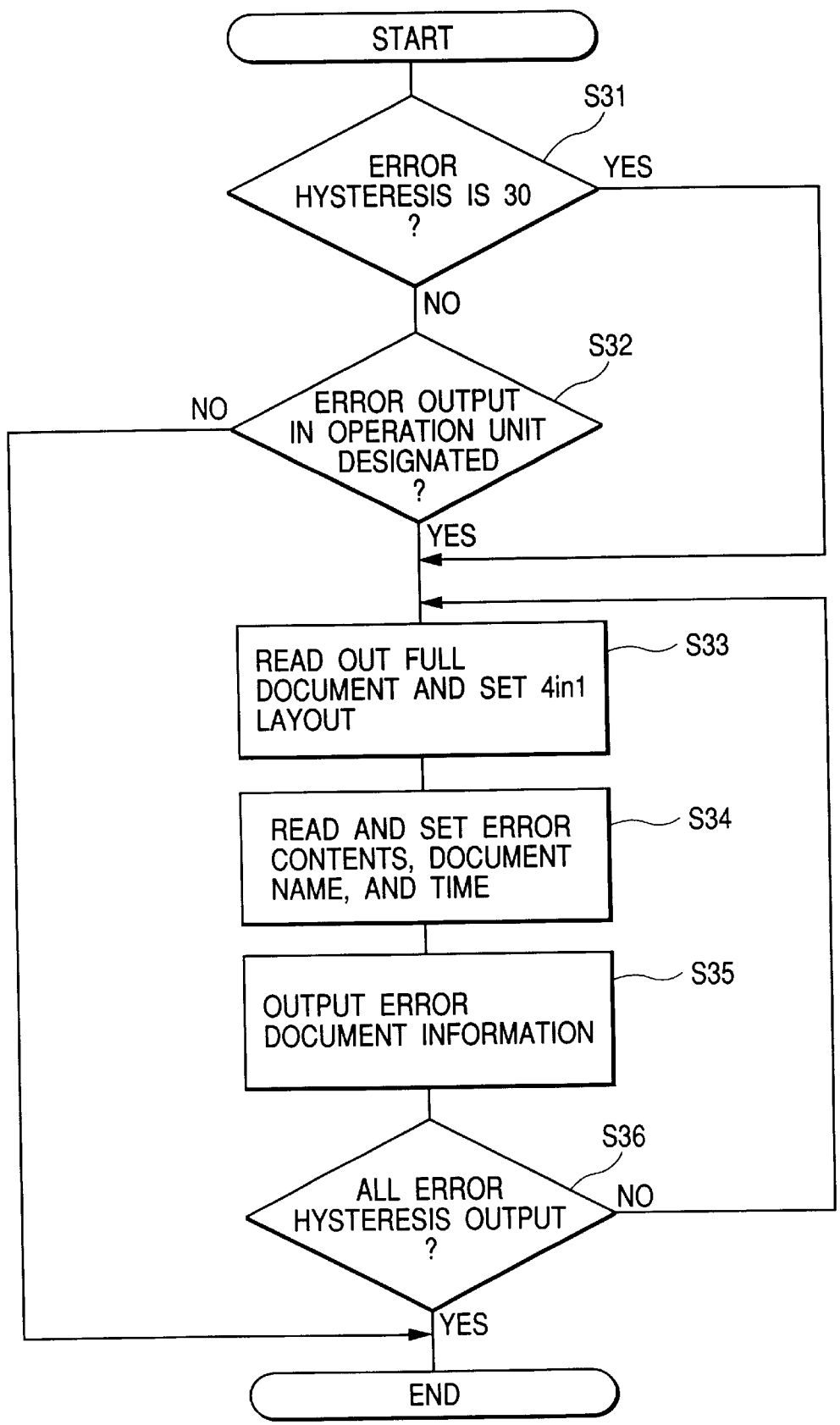
FIG. 9 is a flow chart illustrating a control procedure according to the second embodiment of the invention.

In the flow chart shown in FIG. 8, at step (S21) the external I/F processing unit 209 of the copier stands by until a PDL image is received from the computer 500. When a PDL image is received, the external I/F processing unit 209 develops the received PDL image into a binary bit map image at step (S22), and the electronic sorter unit 203 stores the bit map image in HD 304*b* at step (S23).

At step (S24) it is checked whether HD 304*b* of the electronic sorter unit 203 is full (memory-full). If not, at step (S25) it is checked whether all pages of the PDL job have been stored. If not, the flow returns to step (S21) to wait for a reception of the next PDL original page. If it is judged at step (S25) that all pages of the PDL job have been stored in HD 304*b*, an image stored in HD 304*b* is read at step (S26) and printed out at step (S27) on a recording sheet.

It is checked at step (S28) whether all images have been read. If not, the flow returns to step (S26) to repeat printing. The above operations are repeated for all originals as many times as the number of copy sets requested by a user.

If it is judged as a memory-full at step (S24), at step (S29) only four images are left in HD 304*b* and the other original images are erased.

At step (S30) HD 304*b* is written with a sentence indicating the error contents, a document name of originals and the date and time received by the external I/F processing unit 209 from the computer 500, this information being linked to the left four original images.

Next, it is checked at step (S31) shown in FIG. 9 whether error history such as memory-full described with FIG. 8 has been stored as many as, for example, 30 jobs, and if stored, the flow jumps to step (S33), whereas if not stored, it is checked at step (S32) whether the operation panel of the copier 100 has designated an output of error history, and if designated, the flow advances to step (S33).

At step (S33), four original images left in HD 304*b* because of memory-full are read and stored in the layout memory (DRAM) in a (4-in-1) layout. At step (S34), the information stored in HD 304*b* and linked to the four original images, including the sentence indicating the error contents, the document name of originals and the date and time received by the external I/F processing unit 209 from the computer 500, is converted into character fonts which are stored in the layout memory. At step (S35) the error original information stored in the layout memory is output.

For example, as shown in FIG. 6, information written in the layout memory is directly printed out on a recording sheet.

Alternatively, as shown in FIG. 7, the information written in the layout memory may be displayed on the operation panel of the copier in the form of bit map image, and scrolled by using the up/down keys 701 and 702. In this case, if a return key 700 is depressed, a window with no image is once displayed to allow a user to depress a key which requests the next error job. Upon depression of this key, the image of the next error job such as shown in FIG. 7 can be displayed.

At step (S36) it is checked whether job error information of all jobs has been output. If not, the flow returns to step (S33) to repeat the operation of outputting the job error information of the next job. Each time the error original information is output at step (S36), image data of four originals of each job stored in HD 304*b* and the sentence indicating the error contents, the document name of originals and the date and time received from the host by the external I/F processing unit 209, respectively stored in HD 304*b* and linked to the four-original image data, may be erased.

Next, with reference to FIGS. 10 and 11, the control procedure according to the third embodiment of the invention will be described.

Similar to the second embodiment illustrated in the flow chart of FIG. 8, if HD 304*b* becomes full, image data of four originals of the job is left in HD 304*b*, and the sentence indicating the error contents, the document name of originals and the date and time received from the host by the external I/F processing unit 209, respectively linked to the four-original images, are stored in HD 304*b*.

Figure 10:
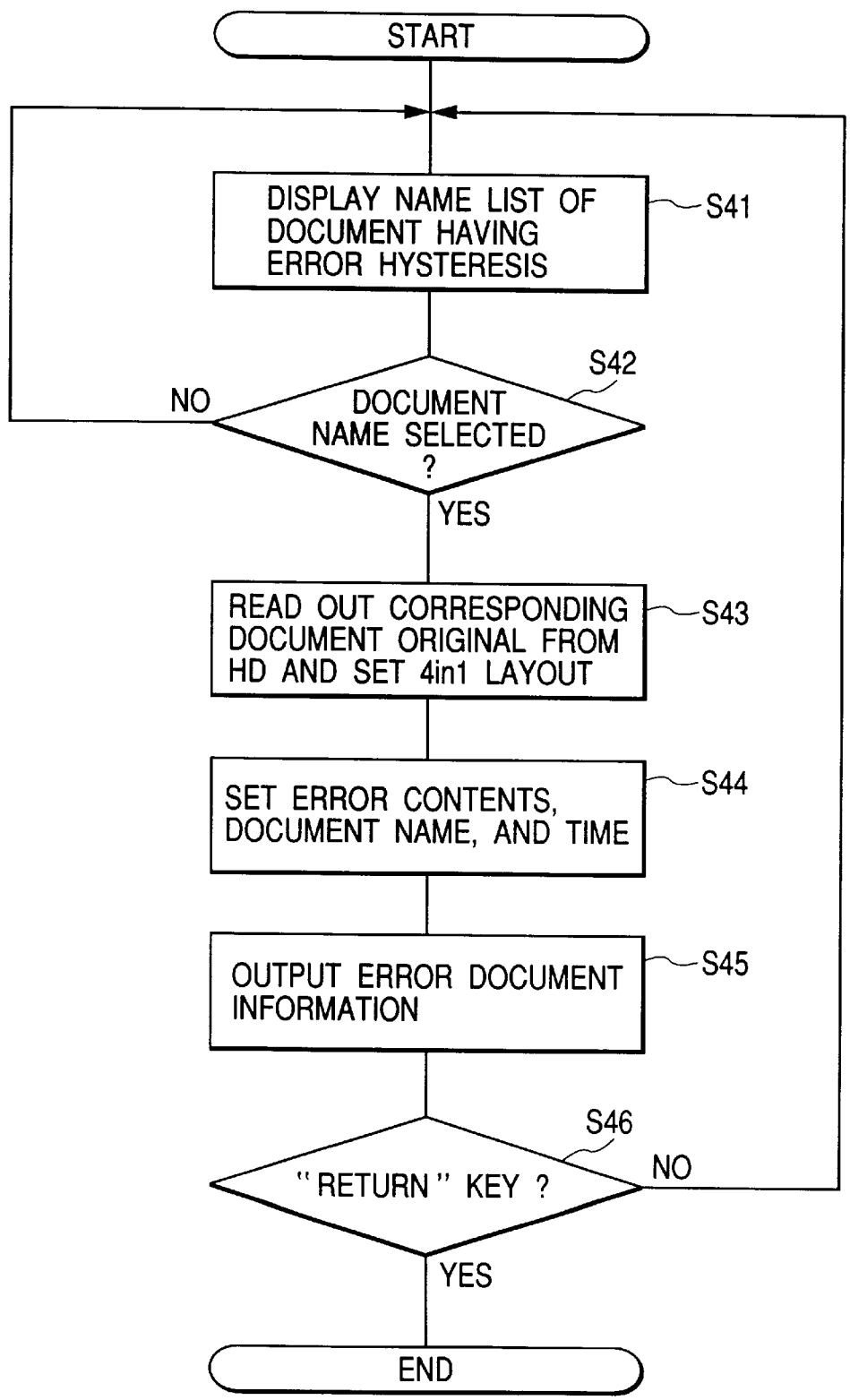
FIG. 10 is a flow chart illustrating a control procedure according to a third embodiment of the invention.

At step (S41) shown in FIG. 10, document names, error contents, dates and times and the like of jobs with error history are displayed on the operation panel of the copier (refer to FIG. 11). Of the jobs displayed on the operation panel of the copier, the job whose contents are desired to be output is selected through key-touch at step (S42). For example, FIG. 11 shows a display when a job No. 6 was selected.

At step (S43) four original images of the selected job left in HD 304*b* when an error occurred are read and stored in the layout memory in a (4-in-1) layout.

The information stored in HD 304*b* and linked to the four original images, including the sentence indicating the error contents, the document name of originals and the date and time received by the external I/F processing unit 209 from the computer 500, is converted into character fonts which are stored in the layout memory at step (S44). At step (S45) the error original information stored in the layout memory is output.

Information written in the layout memory such as shown in FIG. 6 is directly printed out on a recording sheet, by depressing a print key 703 shown in FIG. 11.

Alternatively, by depressing a display key (not shown) replaced by the print key 703, the information written in the layout memory such as shown in FIG. 7 may be displayed on the operation panel of the copier in the form of bit map image, and scrolled by using the up/down keys 701 and 702. In this case, if the return key 700 is depressed, the display screen shown in FIG. 11 is again displayed.

Another job is selected to continue an output of the error original information until the return key 700 shown in FIG. 11 is depressed at step (S46).

Each time the error original information is output at step (S45), image data of four originals of each job stored in HD 304b and the sentence indicating the error contents, the document name of originals and the date and time received from the host by the external I/F processing unit 209, respectively stored in HD 304b and linked to the four-original image data, may be erased.

In the first to third embodiments, images converted from PDL images are printed out. The invention is not limited only to PDL images. For example, original images placed on the platen glass 101 may be input from CCD 109 and printed out via the electronic sorter unit 203.

As described so far, even if a memory-full state occurs while PDL images received from a host computer are stored in the memory such as a hard disk, information about the document name, error contents and the like of a job with a memory-full error, as well as a portion of originals of the job, is output at a lower resolution such as a reduced 4-in-1 layout. Accordingly, when a user later comes to the copier to take printed-out sheets, the user can be reliably informed of a PDL job with a memory-full error.

It is possible to display the document name and error contents of a job with a memory-full error as well as a portion of originals of the job, by using bit map display of the copier itself. Accordingly, when a user later comes to the copier to take printed-out sheets, the user can be reliably informed of the error contents of a job with a memory-full error.

It is possible to print out the document name and error contents of a job with a memory-full error as well as a portion of originals of the job, on a recording sheet. Accordingly, when a user later comes to the copier to take printed-out sheets, the user can be reliably informed of the error contents of a job with a memory-full error.

Even if a memory-full state occurs while PDL images received from a host computer are stored in the memory such as a hard disk, information about the document name and error contents and the like of each job with a memory-full error, as well as a portion of originals of the job, is stored in the memory. Therefore, the document name, error contents of the job with a memory-full error, as well as a portion of originals of the job, can be output later at a lower resolution such as a reduced 4-in-1 layout. Accordingly, a user came to the copier to take printed-out sheets, can be reliably informed of a list of PDL jobs with a memory-full error.

Even if a memory-full state occurs while PDL images received from a host computer are stored in the memory such as a hard disk, information about the document name, error contents and the like of each job with a memory-full error, as well as a portion of originals of the job, is stored in the memory. After the document name and error contents of the job with a memory-full error, as well as a portion of originals of the job, are output later at a lower resolution such as a reduced 4-in-1 layout, the document name and error contents of the job as well as a portion of originals of the job, are automatically erased. Accordingly, an empty space of the memory can be retained immediately and the memory can be efficiently used by another copy operation or PDL job.

Even if a memory-full state occurs while PDL images received from a host computer are stored in the memory such as a hard disk, information about the document name, error contents and the like of each job with a memory-full error, as well as a portion of originals of the job, is stored in the memory. When the number of jobs with a memory-full error becomes equal to or larger than a predetermined job number, the document name and error contents of the job with a memory-full error, as well as a portion of originals of the job, are automatically output at a lower resolution such as a reduced 4-in-1 layout. Accordingly, a user later came to the copier to take printed-out sheets, can be reliably and automatically informed of a list of PDL jobs with a memory-full error.

Even if a memory-full state occurs while PDL images received from a host computer are stored in the memory such as a hard disk, information about the document name, error contents and the like of each job with a memory-full error, as well as a portion of originals of the job, is stored in the memory. When a user wants to check the contents stored in the memory, the user operates upon a key of the copier so that the document name and error contents of the job with a memory-full error, as well as a portion of originals of the job, are output at a lower resolution such as a reduced 4-in-1 layout. Accordingly, a user later came to the copier to take printed-out sheets, can be reliably and immediately informed of a PDL job with a memory-full error.

Even if a memory-full state occurs while PDL images received from a host computer are stored in the memory such as a hard disk, information about the document name, error contents and the like of each job with a memory-full error, as well as a portion of originals of the job, is stored in the memory. When a user later designates the document name with a memory-full error by using the operation panel or the like, the document name and error contents of the job with a memory-full error, as well as a portion of originals of the job, are output at a lower resolution such as a reduced 4-in-1 layout. Accordingly, a user later came to the copier to take printed-out sheets, can be reliably informed of an error state of the job.

A large amount of error information can be known reliably through large size bit map display of the operation panel of the copier.

A large amount of error information can be known reliably by printing out the error information on recording sheets.

Images with a memory-full error can be displayed at a lower resolution such as a reduced 4-in-1 or 9-in-1 layout by using large size bit map display of the operation panel of the copier. Accordingly, a user can be easily informed of the contents of originals with a memory-full error.

Images with a memory-full error can be printed out at a lower resolution such as a reduced 4-in-1 or 9-in-1 layout. Accordingly, a user can be easily informed of the contents of originals with a memory-full error.

Even if a memory-full state occurs while PDL images received from a host computer are stored in the memory such as a hard disk, information about the document name, error contents and the like of each job with a memory-full error, as well as a portion of originals of the job, is stored in the memory. When a user later designates the document name with a memory-full error by using the operation panel or the like, the document name and error contents of the job with a memory-full error, as well as a portion of originals of the job, are output at a lower resolution such as a reduced 4-in-1 layout. Thereafter, the document name and error contents of the job as well as a portion of originals of the job, are automatically erased. Accordingly, an empty space of the memory can be retained immediately and the memory can be efficiently used by another copy operation or PDL job.

What is claimed is:

1. An image processing apparatus comprising:
 means for inputting image information;
 means for storing the image information of a plurality of pages input from said input means;
 first output means for outputting the image information stored in said storing means to an image forming apparatus for forming an image on a recording sheet; and
 second output means for outputting, if all image information of one group cannot be stored in said storing means, discrimination information allowing a user to discriminate the image information not stored in said storing means.

2. An image processing apparatus according to claim 1, wherein said second output means outputs the discrimination information to the image forming apparatus.

3. An image processing apparatus according to claim 2, wherein said image forming apparatus forms an image representative of the discrimination information on a recording sheet.

4. An image processing apparatus according to claim 3, wherein the discrimination information contains at least the image information of a start page of the group.

5. An image processing apparatus according to claim 4, wherein the discrimination information contains at least the image information of a plurality of pages starting from the start page of the group.

6. An image processing apparatus according to claim 5, wherein the image forming apparatus forms reduced images of a plurality of pages on a single recording sheet.

7. An image processing apparatus according to claim 3, wherein the discrimination information contains a title of the image information.

8. An image processing apparatus according to claim 1, wherein said input means inputs image information from an external computer.

9. An image processing apparatus according to claim 8, wherein said input means further includes translation means for translating a page descriptive language input from the computer into an image, and storing the translated image into said storing means.

10. An image processing apparatus according to claim 8, wherein said second output means outputs the discrimination information to the computer.

11. An image processing apparatus according to claim 1, wherein said storing means stores at least a start page of a group as the discrimination information, among the image information of the group whose all pages cannot be stored, and discards the other pages.

12. An image processing apparatus according to claim 11, wherein said storing means stores a plurality of pages starting from the start page of a group as the discrimination information, among the image information of the group whose all pages cannot be stored, and discards the other pages.

13. An image processing method comprising:
 an input step of inputting image information;
 a storage step of storing the image information of a plurality of pages input at said input step;
 a first output step of outputting the image information stored at said storage step to an image forming apparatus for forming an image on a recording sheet; and
 a second output step of outputting, if all image information of one group cannot be stored at said storage step, discrimination information allowing a user to discriminate the image information not stored at said storage step.

14. An image processing method according to claim 13, wherein said second output step outputs the discrimination information to the image forming apparatus.

15. An image processing method according to claim 14, wherein said image forming apparatus forms an image representative of the discrimination information on a recording sheet.

16. An image processing method according to claim 15, wherein the discrimination information contains at least the image information of a start page of the group.

17. An image processing method according to claim 16, wherein the discrimination information contains at least the image information of a plurality of pages starting from the start page of the group.

18. An image processing method according to claim 17, wherein the image forming apparatus forms reduced images of a plurality of pages on a single recording sheet.

19. An image processing method according to claim 15, wherein the discrimination information contains a title of the image information.

20. An image processing method according to claim 13, wherein said input step inputs image information from an external computer.

21. An image processing method according to claim 20, wherein said input step further includes a translation step of translating a page descriptive language input from the computer into an image, and storing the translated image at said storage step.

22. An image processing method according to claim 20, wherein said second output step outputs the discrimination information to the computer.

23. An image processing method according to claim 13, wherein said storage step stores at least a start page of the group as the discrimination information, among the image information of the group whose all pages cannot be stored, and discards the other pages.

24. An image processing method according to claim 23, wherein said storage step stores a plurality of pages starting from the start page of the group as the discrimination information, among the image information of the group whose all pages cannot be stored, and discards the other pages.

* * * * *

UNITED STATES PATENT AND TRADEMARK OFFICE
CERTIFICATE OF CORRECTION

PATENT NO. : 6,002,845

DATED : December 14, 1999

INVENTOR(S) : MASAYUKI HONMA

It is certified that error appears in the above-identified patent and that said Letters Patent is hereby corrected as shown below:

COLUMN 2

Line 18, "cross sectional" should read
    --cross-sectional--.
Line 50, "cross sectional" should read
    --cross-sectional--.
Line 67, "sensor 129" should read --sensor 109--.

COLUMN 3

Line 38, "contact" should read --contacts--.

COLUMN 5

Line 45, "change" should read --changes--.

COLUMN 6

Line 36, "An" should read --A--.

COLUMN 9

Line 63, "came" should read --coming--.

UNITED STATES PATENT AND TRADEMARK OFFICE
CERTIFICATE OF CORRECTION

PATENT NO. : 6,002,845

DATED : December 14, 1999

INVENTOR(S) : MASAYUKI HONMA

It is certified that error appears in the above-identified patent and that said Letters Patent is hereby corrected as shown below:

<u>COLUMN 10</u>

```
Line 22, "came" should read --coming--.
Line 36, "came" should read --coming--.
Line 49, "came" should read --coming--.
```

Signed and Sealed this

Twenty-first Day of November, 2000

Attest:

Q. TODD DICKINSON

*Attesting Officer*  *Director of Patents and Trademarks*